(12) United States Patent
Hassan et al.

(10) Patent No.: US 11,501,470 B2
(45) Date of Patent: Nov. 15, 2022

(54) GEOMETRIC ENCODING OF DATA

(71) Applicant: Microsoft Technology Licensing, LLC, Redmond, WA (US)

(72) Inventors: Amer Aref Hassan, Kirkland, WA (US); Edward C. Giaimo, III, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 275 days.

(21) Appl. No.: 16/884,749

(22) Filed: May 27, 2020

(65) Prior Publication Data

US 2021/0375008 A1    Dec. 2, 2021

(51) Int. Cl.
   *G06T 9/20*    (2006.01)
   *G06N 3/08*    (2006.01)
   *G06T 9/00*    (2006.01)

(52) U.S. Cl.
   CPC .............. *G06T 9/20* (2013.01); *G06N 3/08* (2013.01); *G06T 9/002* (2013.01)

(58) Field of Classification Search
   CPC .............. G06T 9/20; G06T 9/002; G06N 3/08
   See application file for complete search history.

(56) References Cited

U.S. PATENT DOCUMENTS

| | | | |
|---|---|---|---|
| 6,525,722 B1 | 2/2003 | Deering et al. | |
| 6,606,095 B1 | 8/2003 | Lengyel et al. | |
| 8,463,006 B2 | 6/2013 | Prokoski | |
| 9,183,580 B2 | 11/2015 | Rhoads et al. | |
| 9,704,270 B1 | 7/2017 | Main et al. | |
| 10,146,971 B1 | 12/2018 | Cansizoglu et al. | |
| 10,817,990 B1 * | 10/2020 | Yang .................... | G06N 3/0445 |
| 2001/0050682 A1 | 12/2001 | Deering et al. | |
| 2003/0107583 A1 | 6/2003 | Fushiki et al. | |
| 2003/0184556 A1 | 10/2003 | Hollis et al. | |

(Continued)

FOREIGN PATENT DOCUMENTS

| WO | 2012037040 A1 | 3/2012 |
|---|---|---|
| WO | 2019142164 A1 | 7/2019 |

OTHER PUBLICATIONS

"International Search Report and Written Opinion issued in PCT Application No. PCT/US2021/018292", dated May 18, 2021, 28 Pages.

(Continued)

*Primary Examiner* — Fayyaz Alam
(74) *Attorney, Agent, or Firm* — Schwegman Lundberg & Woessner, P.A.

(57) ABSTRACT

Disclosed in some examples are methods, systems, devices, and machine-readable mediums which encode data into a geometric representation for more efficient and secure processing. For example, data may be converted from a binary representation to a geometric representation using an encoding dictionary. The encoding dictionary specifies one or more geometric shapes used in the encoding. The geometrically encoded data may comprise one or more identifiers that specify one or more of the shapes of the encoding dictionary that best match one or more detected features in an image corresponding to the data. In some examples, the geometrically encoded data may also comprise one or more transformations of the one or more shapes to reduce error in the geometric encoding.

19 Claims, 9 Drawing Sheets

(56) References Cited

U.S. PATENT DOCUMENTS

| | | | |
|---|---|---|---|
| 2004/0032980 | A1 | 2/2004 | Harman et al. |
| 2005/0015704 | A1 | 1/2005 | Piret et al. |
| 2006/0262876 | A1 | 11/2006 | Ladue |
| 2007/0127812 | A1 | 6/2007 | Ström |
| 2008/0144942 | A1* | 6/2008 | Besley ................ G06V 30/413 382/209 |
| 2012/0063678 | A1* | 3/2012 | Asikainen .............. H04N 19/93 382/165 |
| 2013/0088555 | A1 | 4/2013 | Hanina et al. |
| 2013/0262957 | A1 | 10/2013 | Wu et al. |
| 2014/0037206 | A1 | 2/2014 | Newton et al. |
| 2015/0117518 | A1 | 4/2015 | Rondao Alface et al. |
| 2015/0181114 | A1 | 6/2015 | Choi et al. |
| 2016/0140689 | A1 | 5/2016 | Lux et al. |
| 2017/0193628 | A1 | 7/2017 | Sharma et al. |
| 2017/0310945 | A1 | 10/2017 | Juang et al. |
| 2018/0109792 | A1* | 4/2018 | Song ..................... H04N 19/51 |
| 2018/0286107 | A1 | 10/2018 | Hemmer et al. |
| 2018/0308257 | A1 | 10/2018 | Boyce et al. |
| 2019/0156520 | A1 | 5/2019 | Mammou et al. |
| 2019/0156557 | A1 | 5/2019 | Gordon et al. |
| 2019/0197739 | A1 | 6/2019 | Sinharoy et al. |

OTHER PUBLICATIONS

Feng, et al., "LOIND: An Illumination and Scale Invariant RGB-D Descriptor", In Proceedings of the IEEE International Conference on Robotics and Automation, May 26, 2015, pp. 1893-1898.

Walia, et al., "Unified Graph-Based Multicue Feature Fusion for Robust Visual Tracking", In Journal of IEEE Transactions on Cybernetics, vol. 50, Issue 6, Jun. 25, 2019, pp. 2357-2368.

* cited by examiner

FIG. 2

GEOMETRIC ENCODING OF DATA

TECHNICAL FIELD

Embodiments pertain to efficient and secure processing of image or video data. Some embodiments relate to encoding data as combinations of one or more geometric shapes. Some further embodiments relate to performing one or more operations on the geometric encoded data.

BACKGROUND

Computing devices process and store data in a binary format that corresponds to an electric charge or an absence of an electric charge in a processor or storage medium. More complex data may be represented by these binary values using various representation schemes. For example, characters may be mapped to different numbers using a lookup table, such as an American Standard Code for Information Interchange (ASCII) table. Strings of ASCII mapped digits may then be combined into strings of characters. As another example, an executable computer program uses numerical values that map to specific instructions (e.g., an opcode) and parameters for those instructions. Complex programs may be built that include many different instructions that all are stored as binary representations of those instructions and parameters. Thus, using various representation methods, it becomes possible to store and operate different representations of data by various mappings that are ultimately stored as a binary representation and processed as binary or higher alphabet streams.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates a representation of binary data according to some examples of the present disclosure

DETAILED DESCRIPTION

Figure 1:
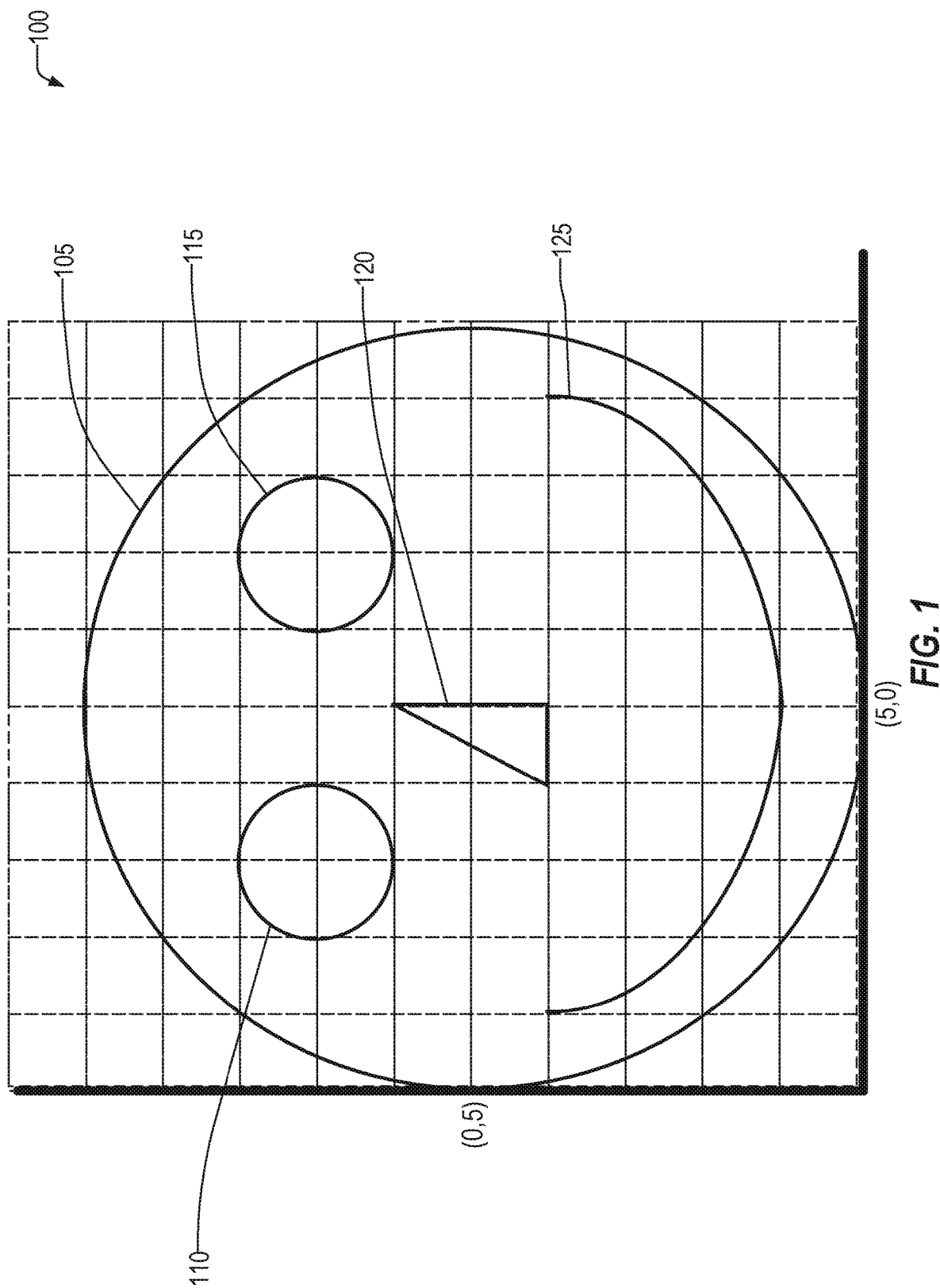
FIG. 1 illustrates an example image according to some examples of the present disclosure.

As another example of how data is represented, one or more images may be encoded as a series of numerical values representing pixel intensities of pixels in a grid. Additional transformations may be applied such that the series of values is compressed or otherwise represented differently. For example, a discrete Fourier transformation of the pixel intensity values may encode the image as a set of values to represent the image in a frequency domain. In other examples, images may be encoded as a sequence of one or more vectors that represent lines or polygons of the image.

Most operations performed on data, such as encoding operations, encryption operations, and image processing operations (such as facial recognition) are designed to operate on these representations of the data. For example, object recognition algorithms may look for transitions in pixel intensities to find edges of objects, apply the pixel intensity data to a neural network to produce an indication of whether an object is present in the image data, and the like. These operations are customized for the particular types of encoding that is used. That is, the structure of the neural network is customized to operate on the particular type of image representation. However, when processing the object, or representation of the object, operations are done on the original pixel representation and NOT on the shapes being recognized. This is not a natural processing of objects, and may not lead to the most computationally efficient and/or accurate solution. For example, the neural network may have one or more layers that convert the pixel values into different representations that are then used by other layers to detect the one or more objects. These additional layers add computational cost and complexity to these operations.

Furthermore, the data representations are well-known and are easy to interpret. Thus, to secure data stored with these representations, encryption algorithms are typically employed. As faster computing devices are designed, traditional encryption algorithms are weakened. In the future, the traditional forms of encryption may be obsolete as further developments in computing power are achieved such as quantum computing.

Disclosed in some examples are methods, systems, devices, and machine-readable mediums which encode data into a geometric representation for more efficient and secure processing. For example, data may be converted from a binary representation to a geometric representation using an encoding dictionary. The encoding dictionary specifies one or more geometric shapes used in the encoding. The geometrically encoded data may comprise one or more identifiers that specify one or more of the shapes of the encoding dictionary that best match one or more detected features in an image corresponding to the data. In some examples, the geometrically encoded data may also comprise one or more transformations of the one or more shapes to reduce error in the geometric encoding.

For example, a detected feature of an image corresponding to input data may best match a circle in the encoding dictionary. The geometrically encoded output may include one or more symbols that identify the circle as being detected as the feature in the image. In some examples a single feature is matched to a single geometric shape in the dictionary. In other examples, multiple geometric shapes may be used to represent a single feature in the image. For example, one or more combinations of shapes (e.g., linear combinations of shapes) may represent one or more features in the image.

As used herein, a feature is a point of interest in the image that may be detected using one or more computer vision algorithms such as feature detection algorithms applied to the input data (the input data representing pixel data). Example features may include edges, ridges, blobs, corners, or the like. Example feature detection algorithms may include Canny, Sobel, Kayali, Harris and Stephens, Plessey, Shi-Tomasi, SUSAN, Shi and Tomasi, Level curve curvature, FAST, Laplacian of Gaussian, Difference of Gaussians, Determinant of Hessian, MSER, PCBR, or Grey-level blobs. As will be described below, in some examples a machine learning algorithm may perform the encoding. In these examples, the feature detection may be performed by a separate machine learned model (the output of which may be used in the machine learned model that does the encoding), or may be incorporated within the machine learned model that performs the encoding (e.g., as one or more layers in the model). The geometric encoding may encode all detected features within the input image, or only some detected features within the image.

As noted, in some examples, the geometric encoding output may also contain symbols that contain identifiers of the transformations to the identified shapes. For example, a scaling, rotation, translation, or other transformation that minimizes an error between the feature of the image and the encoded shape from the geometric encoding dictionary. For example, if a feature of the image is determined to be a circle, the transformation may be a scaling of a default size of the circle (the default size specified by the encoding dictionary). The transformations may result in the encoding being more accurate. In some examples, the transformations may be selected such that an error between an image in a pixel intensity representation reproduced from the shape and the transformation and the feature may be below a threshold. The error may be a number of pixel changes needed to make an image in a pixel intensity representation, created from the one or more geometric shapes and the transformations used to encode that feature, match the feature from the input image.

The encoded data may be used in encoded form or may be used to reconstruct the image or parts of the image. In some examples, only portions of the image are encoded and the rest of the image of the data is left unencoded. The encoding may be relatively lossless if the encoding dictionary is large enough and the transformations are approximated well enough. In other examples, the encoding may be lossy. For example, where transformations are not included in the encoding. In some examples, the lost portions may not be important in the processing of the geometric representation—for example, the lost portions may represent features of the image that are not important to the processing done to the geometric representation and thus the loss is not important. For example, the geometric encoding dictionary may contain geometric shapes that are capable of encoding any features deemed important to the processing done to the geometric representation. In still other examples, a compromise may be made between image accuracy and time needed to geometrically encode the image. For example, an accuracy threshold may be set, either by an administrator, or by feedback from use cases (e.g., feedback of object recognition processes) on whether the geometric encoding is accurate enough.

Example benefits of the geometric encoding include more secure data, higher compression levels, more efficient calculations, double encryption, and the like. For example, if the encoding dictionary is kept secret, the geometric encoding may be a form of encryption that may be very difficult to break, even by more advanced computing hardware. This security may be enhanced by encrypting the binary storage of the geometric encoding—resulting in a double encryption whereby an adversary would have to first break the encryption on the binary data and then figure out the encoding dictionary to recover the data. Additionally, a mapping table may also be used to further increase security wherein a first combination of encoded symbols maps to a second combination of substituted symbols. The mapping table may be kept secret resulting in a third level of security. This triple-layer encryption may be useful in resisting quantum computing attacks on cryptography.

As also noted, the geometric representation may also result in more efficient operations and reduced complexity for operations such as object recognition (such as facial recognition) because the geometric representation is a natural method to process data in computer vision domain. For example, by representing the image as a collection of geometric shapes, object recognition may be simplified. A template of the object that is being searched for may be geometrically encoded. The image in which the object is being searched for may also be geometrically encoded. To find the object in the image, the computing device may do a very computationally efficient text search to determine if the shapes in the template are present in the geometric encoding of the image.

Finally, the geometric representation can compress the contents of the image. The compression rate depends on the level of loss tolerated and the size of the encoding dictionary. For example, a small encoding dictionary and a high level of loss leads to a high compression. The shapes selected for the dictionary may be used to select features of the image that are important for whatever operations are being performed on the geometrically encoded data. For example, for object recognition, the dictionary may be selected based upon the exemplars such as by analyzing the shapes in the exemplars and selecting the top threshold number of shapes. This may produce a very efficient encoding that encodes only shapes that are relevant to the object recognition while at the same time producing a smaller encoding.

The geometric encoding thus solves the technical problems present in binary-based representations of in-efficient, insecure, and large data representation by utilizing a technical solution of encoding the data in a more efficient and compact manner using geometric shapes and/or transformations. This encoding produces the technical effect of producing more natural, more secure, and more compact representations of data as one or more shapes and/or one or more transformations. As noted, the shapes of an encoding may be directly compared for image recognition. The encoding may be more compact, depending on the encoding dictionary and transformations; and may be more secure when combined with encryption and/or hiding of the encoding dictionary.

As previously described, the geometric encoding operates by matching features of an image to one or more of the shapes in the encoding dictionary. In some examples, the data is itself a representation of, or may be represented by an image. For example, the data may be a digital image encoded as previously described using pixel values (e.g., a bitmap using red, green, and blue pixel intensity values) or vector components. This image is then converted to a geometric encoding. In other examples, the binary data itself may form a black and white image by encoding a '1' as a white and '0' as black on a grid where the horizontal and/or vertical number of binary digits may be defined or may be determined based upon the size of the data. The image formed in this way may then be geometrically encoded.

The geometric encoding dictionary used in the encoding may be predefined, but in other examples, the geometric encoding dictionary may be determined from or selected based upon the data itself. The geometric encoding dictionary may be global. That is, a same geometric encoding dictionary may be used for all geometric encodings in a same device, group of devices, or for all devices. In some examples, the geometric encoding dictionary used may be different between each encoding or groups of encodings.

In some examples, the geometric encoding dictionary may be selected from a plurality of geometric encoding dictionaries or created based upon the input data. The selection may be based upon one or more of: the type of data that is being encoded, the use of the encoded data, a desired loss level of the encoding, or the like. For example, input data that represent images may have a different encoding dictionary than input data that represents other data. The selection may be based upon the use of the encoded data. As previously noted, object recognition use cases may use the exemplars of the objects that are to be detected to select the shapes in the dictionary. Security use cases may use more complicated encoding dictionaries to ensure it would be difficult to reverse engineer the dictionary. The selection may be based upon a desired loss level of the encoding. For example, if the encoding should capture all the features of the input data exactly, the encoding dictionary may be larger and different than if a very simple encoding is desired that may have lots of loss. The selection may be based upon any one or more of the above factors and others.

The geometric encoding dictionary may comprise one or more geometric shapes, such as geometric primitives. For example, circles, lines, polygons, and the like. The geometric shapes of the encoding dictionary may have one or more default properties (parameters) that define a default construction of the shape such as default position, size, color, alpha value, layer, orientation, and the like. In some examples, the geometric encoding dictionary may include one or more shape descriptors that may include properties of the shape that may be used when matching the geometric shape to a feature in the image. Example descriptors include an image of the default shape (e.g., pixel values of the shape with default properties), a description of the shape given other shapes in the geometric encoding, point data, vertex data, or the like. In some examples, the geometric encoding dictionary may also define the allowed transformations to those shapes. When processing an image or movie in the geometric domain, processing can be for the partial image (as pointed out earlier), or the image is first represented by a collection of geometric figures from the dictionary prior to encoding. For instance, most images in a room can be represented by a lossy transformation of every object in the image as rectangles and circles to produce a simple representation. In some examples, triangles may also be added to reduce distortion or loss.

FIG. 1 illustrates an example image 100 according to some examples of the present disclosure. An example geometric encoding of the image 100 will now be described. If the geometric encoding dictionary includes three shapes: circles, triangles, and squares; the image may be encoded as a series of circles, triangles, and squares or combinations of those shapes. In some examples, the encoding may also specify various transformations of those shapes from default properties. The default properties may be specified by the geometric encoding dictionary.

Shapes defined by the geometric encoding dictionary may be combined in a variety of ways to encode features that are not exact shapes. For example, the smile 125 is a half-circle—but the geometric encoding dictionary does not have a half-circle shape. In some examples, this error may be ignored. That is, the smile 125 may be represented by a full circle. In other examples, these shapes may be represented as combinations of multiple shapes that are combined according to an operator. Example operators include union operations, combine operations, subtract operations, and the like. For example, the smile 125 may be composed of a circle and a rectangle that is subtracted from the circle. In other examples, various layers may be used to create the desired shape. In these examples, the smile 125 may be formed by making a first circle in a first layer and a transparent rectangle that "erases" the second half of the circle in a second layer. In still other examples, the "smile" may be formed by adding additional shapes to the encoding dictionary such as splines or other curves. In still other examples, transformations such as half shapes, folded shapes, and the like may be utilized.

The following shows one example in which the smile and the nose are made based upon "subtracting" from a shape using layers. Further, once a shape is created from one or more constituent shapes, the encoding may have one or more symbols that define that shape as a reference shape that then may be used later. For example, the smile 125 may be defined as a reference shape that may be used later with its own transformations to the reference size and shape.

In the example of FIG. 1, if the encoding dictionary is defined as:
   0: a circle with a default center of (0,0) with a radius of 1 and a color of black.
   1: a triangle with a default center of the origin with equilateral sides and a size of 1 and a color of black.
   2: a square with a default center of (0,0) with a size of 1 and a color of black.
If the transformations defined by the encoding dictionary are as follows:
   1: translation—moves the center of a shape by a given (x,y) value.
   2: scale—scales the shape by increasing its size in the x direction by the indicated x scaling factor and in the y direction by the indicated y scaling factor.
   3: color—changes the default color (default is black or 0, white is 1).
   4: layer specifier (default 1)—defines the order in which shapes are overlaid (layer 1 is drawn first, followed by other layers).
   5: fill specifier (default unfilled)—with a color (0 black, 1 white)
An encoding of shapes 1 . . . x with shape 1 having n transformations and shape x having y transformations may be specified as <shape 1>:(transformation 1, value), . . . (transformation n, value); . . . <shape x>:(transformation 1, value), . . . (transformation y, value).
An example encoding of the image of FIG. 1 might be as follows:
   Smile 125 is made of two shapes, a first circle represented by an index 0 with transformations of a translation—written as: (1, 5, 4); a scale operation—written as (2, 4, 3), and a layer operation written as: (4, 1)—note that the scale transformation in this example increases a radius in the x and y direction of the circle; and a second shape of a square covering up the upper half of the mouth: 2: (1, 5,6), (2, 8, 4), (4,2), (5,1)
   Nose 120 is also made of two shapes, a first triangle: 1: (1, 5, 5), (2, 1, 1), (4,3) and a square that covers up the right half of the triangle: 2: (1, 6,5), (2, 1, 1), (5,1), (4,4)
   Circle 105: 0: (1, 5, 5), (2, 5, 5), (4, 5))
   Circle 110: 0: (1, 3, 7), (4,5))
   Circle 115: 0: (1, 7, 7), (4,5))

The entire encoding is thus given by the symbols: 0: (1,5,4)(2, 4, 3)(4,1); 2: (1, 5,6), (2, 8, 4), (4,2), (5,1); 1: (1, 5, 5), (2, 1, 1), (4,3); 2: (1, 6,5), (2, 1, 1), (5,1), (4,4); 0: (1, 5, 5), (2, 5, 5), (4, 5)); 0: (1, 3, 7), (4,5)); 0: (1, 7, 7), (4,5)).

The units referred to by the default properties and the transformations may correspond to pixels, groups of pixels (e.g., each (x,y) coordinate in the encoded geometric representation may refer to more than one pixel), or the like.

As noted above, the smile was created through using multiple layers and by merging those layers. Layers may be merged using one or more blending modes. Example blending modes may include a normal mode in which layers on top may cover the layers below; a difference mode in which one layer is subtracted from another layer; an addition mode in which one layer is added to another layer; and the like. In some examples, the normal mode is the default and changes to the normal mode may be indicated through a transformation.

In other examples, the smile may be created using various combinations of shapes of the encoding dictionary. For example, a combination identifier may be used (in place of a shape identifier) that specifies two or more shapes that are combined according to a combination operator. The combination operator may include a union operator (which creates a shape from the perimeter of overlapping constituent shapes), a combine operator (which creates a shape that cuts out the overlapping portion of the constituent shapes), a subtract operator (which creates a shape by subtracting areas of the first listed shape that overlap with subsequent listed shapes), and the like. For example, to create the smile 125, under this encoding, a combination indicator may be used (say the number 3) as follows: <combination indicator, shape 1, transformation to shape 1, shape 2, transformation to shape 2, . . . shape n, transformation to shape n, combination operator identifier>. In this example, if the combination indicator is "3" and the subtraction operator is 3, then the smile 125 may be defined as (3, ((0, (1, 5, 4), (2, 4, 3)), 2: (1, 5,6), (2, 8, 4), 3).

As previously described, the shape may have one or more alpha values. Alpha values are a measure of how transparent the shape is. That is, the shape is composited with the background using the alpha value to determine how the shape "blends" into the background and other layers using a process called alpha blending. The various alpha operations (over, in, out, atop, xor) may be specified along with the alpha value as a transformation to a default alpha value of a shape. In some examples, each layer may have shapes with alpha values and each layer may be composited over other layers according to the various alpha operations. In still other examples, each shape of each layer may have its own an alpha value and specified operation that applies to either all other layers, or the operation is specific to a particular identified layer. That is, each shape may have an alpha value and alpha operation that applies to a first layer and a separate alpha value and alpha operation that applies to a second layer.

As can be appreciated, the above encoding is but one example of not only an encoding, but a particular way of representing the encoding. Other ways of representing the encodings are possible, such as listing transformations first, listing shapes and transformations separately, and the like. As can be appreciated, compared with other ways of representing the shape—such as a bitmap, image 100 is represented by a respectively limited amount of data.

As previously described the smile 125, which is made up of two different shapes may be made into a reference shape. This may be accomplished by using a particular indicator in the encoding. For example, by placing a particular number or sequence and an identifier prior to the encoding. Any other usages of that reference shape use the identifier of the reference shape instead of the identifier of a dictionary shape. The default properties are the parameters specified by the reference shape upon definition. Thus, by using reference shapes, the encoded data expands and customizes the geometric encoding. This also makes the geometric encoding more secure as attempts to break the encoding dictionary may be made more difficult by the presence of these custom shapes.

Figure 2:
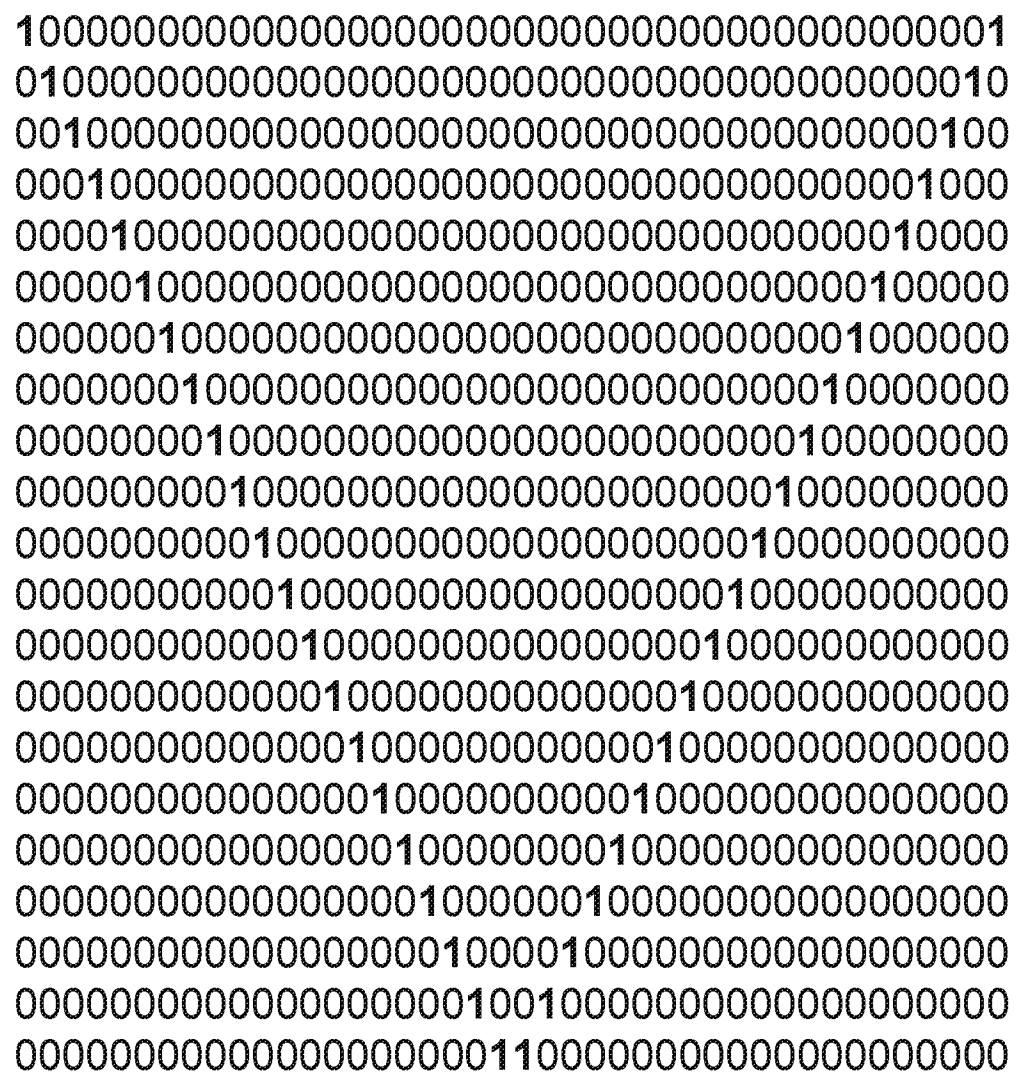

As previously described, the encoding may be applied to images, but in other examples, the data may form an image by itself that is then used. Turning now to FIG. 2, a representation of binary data is shown. The binary data is represented by printing 42 consecutive binary characters in the data per line. This representation produces an image—e.g., a 1 is treated as a pixel of a first color and a 0 is treated as a pixel of a second color and the data is plotted on a grid that is (x) characters wide and (y) characters high, where x and/or y are specified or determined. In some examples, where only one of x or y is specified, the other dimension is determined by the size of the data. The representation shown in FIG. 2 is that of a "V". This image may be represented using geometric encoding. For example, an encoding dictionary might be a letter "V" in which case the data is encoded to be a single character: 1(42, 21) to signify the presence of the V and the size. In other examples, instead of a "V" the encoding dictionary might include a line. In these examples, the geometric representation would include a set of data indicating two lines and any transformations to the default values of those lines to produce the V.

In this way, data such as an executable file, object, or other data that does not represent an image may be geometrically encoded. This may also allow already encrypted data to be geometrically encoded to further enhance security. In still other examples, the encrypted binary data is geometrically encoded, and the binary data representing the geometric encoding may be further encrypted—thus providing three or more layers of encryption.

Geometric Encoding Algorithms

In some examples, the geometric encoding algorithm may employ a machine-learned model, such as a computer vision model. In a first example, a model may be trained on a plurality of sample images and an encoding dictionary. For example, the sample images may be labeled with the correct encoding for the sample images. The model may then learn to detect the various geometric shapes in the encoding dictionary as well as, in some examples, the appropriate transformations of those shapes. Different encoding dictionaries may utilize different trained models. As noted, the training data may include pixel values (e.g., bitmaps or other image formats) of sample images labeled with the proper geometric encoding. The sample images may include one or more of: simple images with one or more geometric shapes from the encoding dictionary, advanced images with multiple geometric shapes, photographic pictures, facial images, video frames, or the like. In some examples, in addition to, or instead of labelled encodings as training data, a model may be trained through use of an error function that quantifies an error between an image reconstructed from an output encoding and the original image. The error may be a sum total of all pixels that are wrong between the reconstruction and the input image.

After training, during usage of the model, the image to be encoded is supplied as input to the model. The model then produces an encoding as output, including an identification of one or more shapes and in some examples, one or more transformations to those shapes. Example machine learning algorithms may include neural networks, deep neural networks, and the like. The machine-learned model may include one or more layers that find features in the input image and one or more layers that match shapes from the encoding dictionary to the detected features and in some examples, one or more layers that determine transformations.

In some examples, the system may use or employ an object detection machine learning model that both locates the presence of objects within an input data set and classifies the objects based upon the encoding dictionary. These models may be utilized by the system to detect dictionary shapes within the input image. Additional layers, models, or algorithms may be used to convert the detected shapes into an encoding along with proper transformations. For example, a convolutional neural network (CNN), a region-based CNN (r-CNN), a full CNN (for semantic segmentation), a mask R-CNN algorithm for instance segmentation, and the like. The models may be trained using sample images from the encoding dictionary along with labels identifying the appropriate geometric shapes and/or based upon an error function as previously described. In some examples, object segmentation may also be performed that locates the specific pixels of the shapes.

As noted, a Region-Based Convolutional Neural Network (R-CNN) or similar algorithms may be used. R-CNN is described by Rich feature hierarchies for accurate object detection and semantic segmentation by Girshick, R., Donahue, J., Darrell, T., & Malik, J., Proceedings of the IEEE conference on computer vision and pattern recognition (2014). The R-CNN technique may first generate and extract candidate bounding boxes from the input image using a selective search mechanism. The R-CNN then submits each region of interest to a feature extractor, such as an AlexNet deep Convolutional Neural Network (CNN) or a Scale Invariant Feature Transform (SIFT), to extract features from the candidate bounding boxes. Finally, a classifier, such as a linear support vector machine (SVM) may be used to classify the features as one or more shapes. A different SVM may be trained to detect each geometric shape in a geometric encoding dictionary. Other similar algorithms may be used, such as Fast R-CNN. Fast R-CNN may run the feature recognition neural network once on the whole image, rather than on each region of interest. Fast R-CNN then uses ROIPooling to slice out each region of interest from the output and classifies it. In other examples, Faster R-CNN may be used as described by Faster R-CNN: Towards Real-Time Object Detection with Region Proposal Networks by Shaoqing Ren, Kaiming He, Ross Girshick, and Jian Sun, IEEE Transactions on Pattern Analysis and Machine Intelligence (Volume: 39, Issue: 6, Jun. 1, 2017) which integrates region of interest generation into the neural network itself. In still other examples, the system may utilize a Region-Fully Convolutional Neural Network (R-FCN) as described by the paper R-FCN: Object Detection via Region-based Fully Convolutional Networks by Jifeng Dai, Yi Li, Kaiming He, and Jian Sun, $30^{th}$ Conference on Neural Information Processing Systems (NIPS 2016), Barcelona, Spain.

Instead of, or in addition to the R-CNN methods, the system may utilize a Single Shot Multibox Detector, described by Liu W. et al. (2016) SSD: Single Shot MultiBox Detector. In: Leibe B., Matas J., Sebe N., Welling M. (eds) Computer Vision—ECCV 2016. ECCV 2016. Lecture Notes in Computer Science, vol 9905. Springer, Cham. The SSD utilizes a VGG-16 neural network (a convolutional neural network model proposed by K. Simonyan and A. Zisserman from the University of Oxford in the paper "Very Deep Convolutional Networks for Large-Scale Image Recognition") architecture that replaces the fully connected layers with a set of auxiliary convolutional layers (from conv6 onwards) to enable feature extraction at multiple scales. The SSD is trained with ground truth bounding boxes and assigned class labels for each shape in the encoding dictionary.

In other examples, the system may employ a template-based matching using cross correlation or sum of absolute differences. For example, a cross correlation output of the template and an image is highest at places where the image structure matches the template structure—that is, where large image values get multiplied by large mask values.

In still other examples, the system may employ one or more edge finding algorithms (e.g., a difference of Gaussians) to find one or more features in the image. The system may then attempt to match one or more of the shapes in the encoding dictionary to one or more of the features found in the data. For example, by trying different combinations of shapes in the dictionary with different combinations of transformations. For example, the system may try and represent all the features in the image with circles for each of a predetermined number of transformations. Each time a shape and transformation are tried, the result is scored against the original image by comparing a pixel intensity representation (e.g., bitmap) of the feature with a pixel intensity representation of the transformation (e.g., a bitmap). An error value may quantify a difference between the produced image from the geometric shape and the transformation (e.g., a number of pixels that are not the same between the images). The shape and transformation pair with the lowest error may be used to represent that feature. Once all the features that are to be encoded have assigned corresponding shapes, the geometric representation may be considered complete.

In some examples, to determine one or more transformations, the system may include the transformation determination as part of the machine learning algorithm. In other examples, the system may apply segmentation to the detected shapes to determine the exact pixels that form the detected shape (rather than a bounding box). For example, by using a MASK R-CNN model described by Mask R-CNN by Kaiming He, Georgia Gkioxari, Piotr Dollar, Ross Girshick, 2017 IEEE International Conference on Computer Vision (ICCV), October 2017. Mask R-CNN improves previous R-CNN models by adding a branch for predicting an object mask in parallel with the existing branch for predicting a bounding box recognition.

Once the object segments (e.g., the pixels at which the object is located) are identified and classified, they may be compared with the default properties of the classified geometric object in the encoding library to compute the difference—which is then identified as the transformation. For example, translation transformations may simply use the location of the feature in the image determined by the identified segment. For other transformations, a simple algorithm may iterate through a plurality of different transformations and/or transformation combinations. Each iteration, the system may check an error (e.g., a sum of the difference in pixel values between the transformed shape and the segmented feature from the input image). If the error is decreasing, the transformation is increased in magnitude (e.g., a scaling transformation is increased; a rotation angle is increased; and the like) and the error is recomputed. This continues until the error starts increasing. Once the error starts increasing, the transformation that preceded the first error increase may be utilized, and the system may move on to finding other transformations. In some examples, transformations may be tried one at a time. In other examples, combinations of transformations may be iterated over as described.

In still other examples, the transformations may be found by applying one or more additional layers or models to the R-CNN algorithms that are trained to operate on the output of the segmentation mask and the classified geometric encoding shape to learn a proper transformation. This additional layer or model may be trained by using sample images of one or more geometric shapes labeled with the appropriate transformation.

As previously described, in some examples, the system may geometrically encode only certain features of the image. For example, for a picture of a person in front of a bookcase, the system may geometrically encode only squares found in the image—which may be found from where the vertical and horizontal pieces of the bookcase merge (or elsewhere in the room). In other examples, the system may geometrically encode additional features, but not all features. In still other examples, the entire image may be geometrically encoded.

Figure 3:
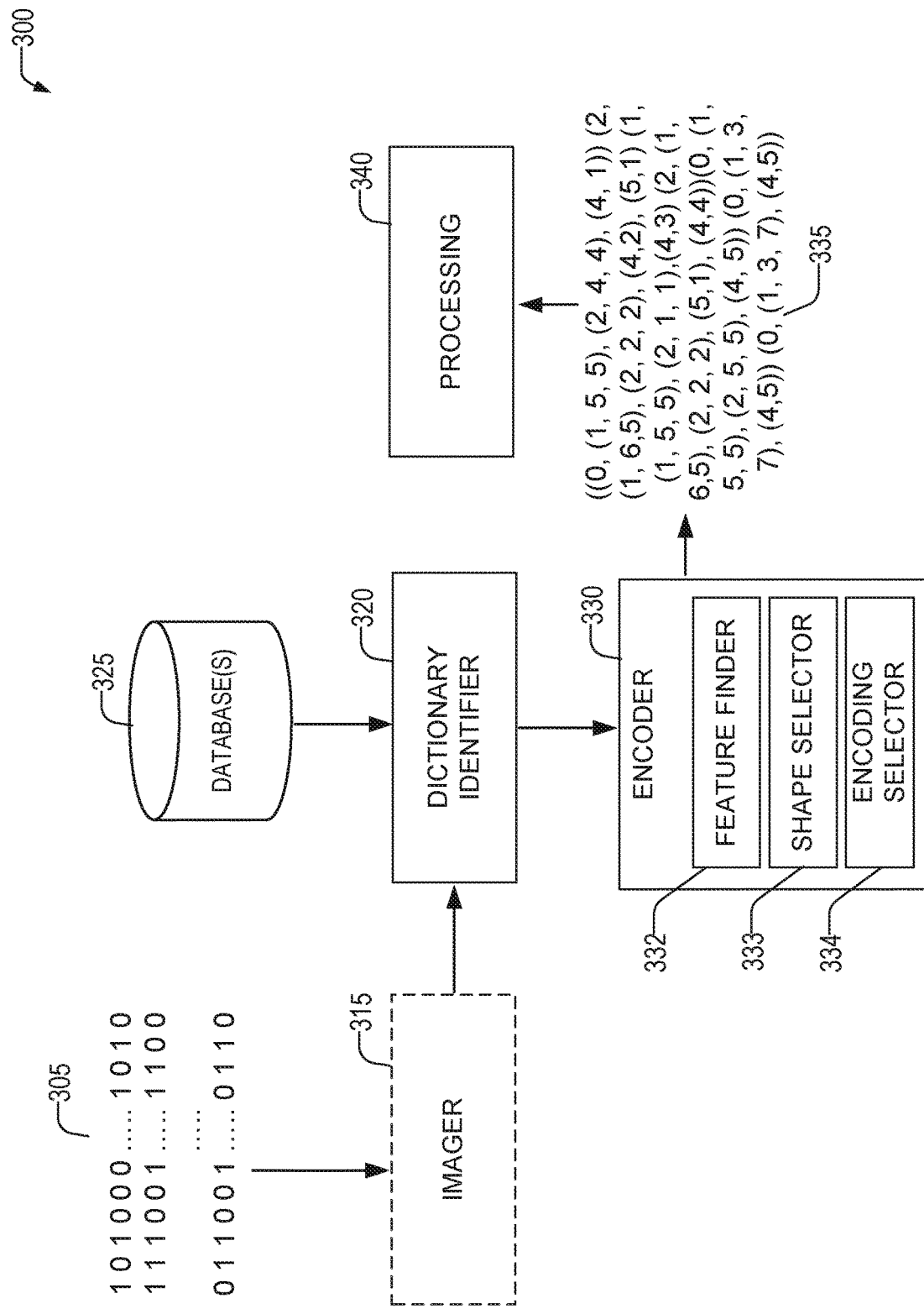
FIG. 3 shows an example of an encoder according to some examples of the present disclosure.

FIG. 3 shows an example of an encoder 300 according to some examples of the present disclosure. Data set 305 may be input to an imager 315. In some examples, the data set represents an image—such as being in a bitmap, jpg, or other format. In other examples, the data set 305 may represent an executable file, a document (portable document format, word processing document, text file, data file, or the like), an audio file, a video file, recordable media, a compressed file, an archive file, a shortcut file, a computer aided design file, an electronic design automation file, a database file, a desktop publishing file, financial records, font files, geographic information system files, graphical information organizers, raster graphics, color management files, color palettes, vector graphics files, 3D graphics models, mathematical files, object code, executable files, shared and dynamically linked libraries, page description languages, personal information manager files, scientific data exchange, project management files, code files and scripts, certificates, keys, encrypted files, password files, signal data, sound files, playlists, audio editing files, spreadsheets, tabulated data, video game data, virtual machine data, web pages, markup language, temporary files and other data. In some examples, the files encode images—or in the example of video files, a sequence of images. In these examples, the imager 315 may convert the image file into a standardized representation. For example, a file encoded according to a Joint Picture Experts Group (JPEG) standard may be converted into a bitmap and the like. In some examples in which the data does not encode an image, the data may be converted to an image as per the process described with reference to FIG. 2 by the imager 315. In other examples, even data that does encode images (image files, video files, and the like) may be encoded as per FIG. 2 using the binary data of the image by the imager 315.

Dictionary identifier 320 may identify or create one or more geometric encoding dictionaries that specify a plurality of shapes to use in the encoding. In some examples, there may be a plurality of different dictionaries with one or more different shapes and/or allowable transformations between each of the different encoding dictionaries. The dictionary identifier 320 may select a dictionary as previously described, such as based upon a user preference, a predetermined dictionary, the type of data represented by data set 305, the use case of the geometric encoding, based upon exemplars (in the case of object recognition), or the like. In other examples, dictionaries may be adapted to a particular type of data being stored in the file (e.g., files representing images may be encoded with a different dictionary with different shapes than files encoded using the binary image as described in FIG. 2).

Dictionary identifier 320 may pass the identified geometric encoding dictionary and the data set 305 as processed by the imager 315 to the encoder 330. Encoder 330 applies the techniques described herein such as using a machine learning model and/or shape matching algorithm to produce a geometric encoding 335. The geometric encoding 335 may specify a plurality of geometric shapes, and corresponding transformations of those shapes in order to represent the data set 305. For example, the encoder 330 may have a feature finder 332 to find features of the data set 305, a shape selector 333 and encoding selector 334 to find a shape from the geometric encoding dictionary and transformation that produce an error from the original image that is below a threshold. As noted, in some examples, the feature finder 332, shape selector 333, and encoding selector 334 is implemented by a machine learned model—such as described in FIG. 4.

Once the data set 305 is encoded, it may be processed by a processing component 340. For example, processing component 340 may search for one or more objects in the geometric encoding 335, such as faces. In other examples, the processing may be a transmission component that transmits the geometric encoding 335. In still other examples, the geometric encoding 335 may be further encoded or encrypted by the processing component 340.

Figure 4:
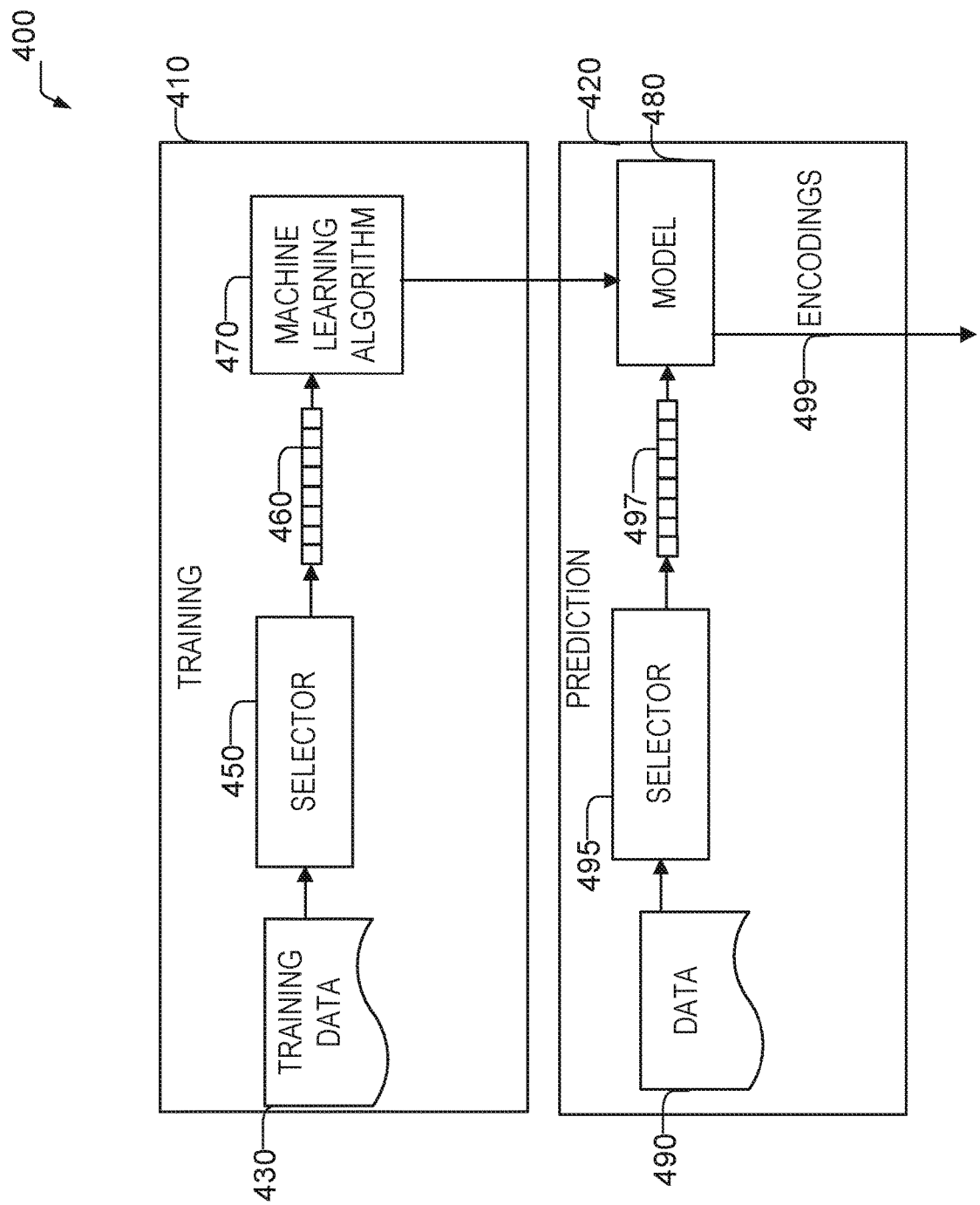
FIG. 4 shows an example machine learning module according to some examples of the present disclosure.

As one example encoding method, a machine learning algorithm may be utilized. FIG. 4 shows an example machine learning module 400 according to some examples of the present disclosure. The machine learning module 400 may be implemented in whole or in part by one or more computing devices. In some examples, the training module 410 may be implemented by a different device than the prediction module 420. In these examples, the model 480 may be created on a first machine and then sent to a second machine.

Machine learning module 400 utilizes a training module 410 and a prediction module 420. Training module 410 inputs training data 430 into selector module 450. The training data 430 may include one or more images represented by a data set. For example, if the data set is a graphics interchange format (GIF) or Bitmap image, the data set itself may be converted into a format compatible with the training module. In the case where the data set represents an image as printed (e.g., FIG. 2), then the image as printed may be converted to a GIF, bitmap, or some other format compatible with the training module. The training data 430 may be labeled with the desired encoding according to a particular encoding dictionary. In other examples, the training data may not be labeled, and the model may be trained using feedback data—such as through a reinforcement learning method. The feedback data may be a measure of error between an image encoding produced by the model and the actual training image. For example, an error function where error increases for each pixel that is different between the input training image and an image reconstructed from the encoding produced by the model.

Selector module 450 converts and/or selects training vector 460 from the training data 430. For example, the selector module 450 may filter, select, or otherwise convert the training data. For example, the selector module 450 may apply one or more feature selection algorithms to find features in the training data. The selected data may fill training vector 460 and comprises a set of the training data that is determined to be predictive of an encoding. Information chosen for inclusion in the training vector 460 may be all the training data 430 or in some examples, may be a subset of all the training data 430. The training vector 460 may be utilized (along with any applicable labels) by the machine learning algorithm 470 to produce a model 480. In some examples, other data structures other than vectors may be used. The machine learning algorithm 470 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 420, data 490 that is to be encoded may be input to the selector module 495. The data 490 that is to be encoded includes the image to be encoded that is represented by a data set. For example, if the data set is a graphics interchange format (GIF) or Bitmap image, the data set itself may be converted into a format compatible with the training module. In the case where the data set represents an image as printed (e.g., FIG. 2), then the image as printed may be converted to a GIF, bitmap, or some other format compatible with the training module. Selector module 495 may operate the same, or differently than selector module 450. In some examples, selector modules 450 and 495 are the same modules or different instances of the same module. Selector module 495 produces vector 497, which is input into the model 480 to produce an encoding 499. For example, the weightings and/or network structure learned by the training module 410 may be executed on the vector 497 by applying vector 497 to a first layer of the model 480 to produce inputs to a second layer of the model 480, and so on until the encoding is output. As previously noted, other data structures may be used other than a vector (e.g., a matrix).

The training module 410 may operate in an offline manner to train the model 480. The prediction module 420, however, may be designed to operate in an online manner. It should be noted that the model 480 may be periodically updated via additional training and/or user feedback. For example, additional training data 430 may be collected as users provide feedback on the encoding. In some examples, the prediction system may convert the encoding of one or more images represented by data 490 back into an image and calculate an error from the original data 490. The error, along with the data 490 may be used to refine the model by the training module 410.

The machine learning algorithm 470 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

Figure 5:
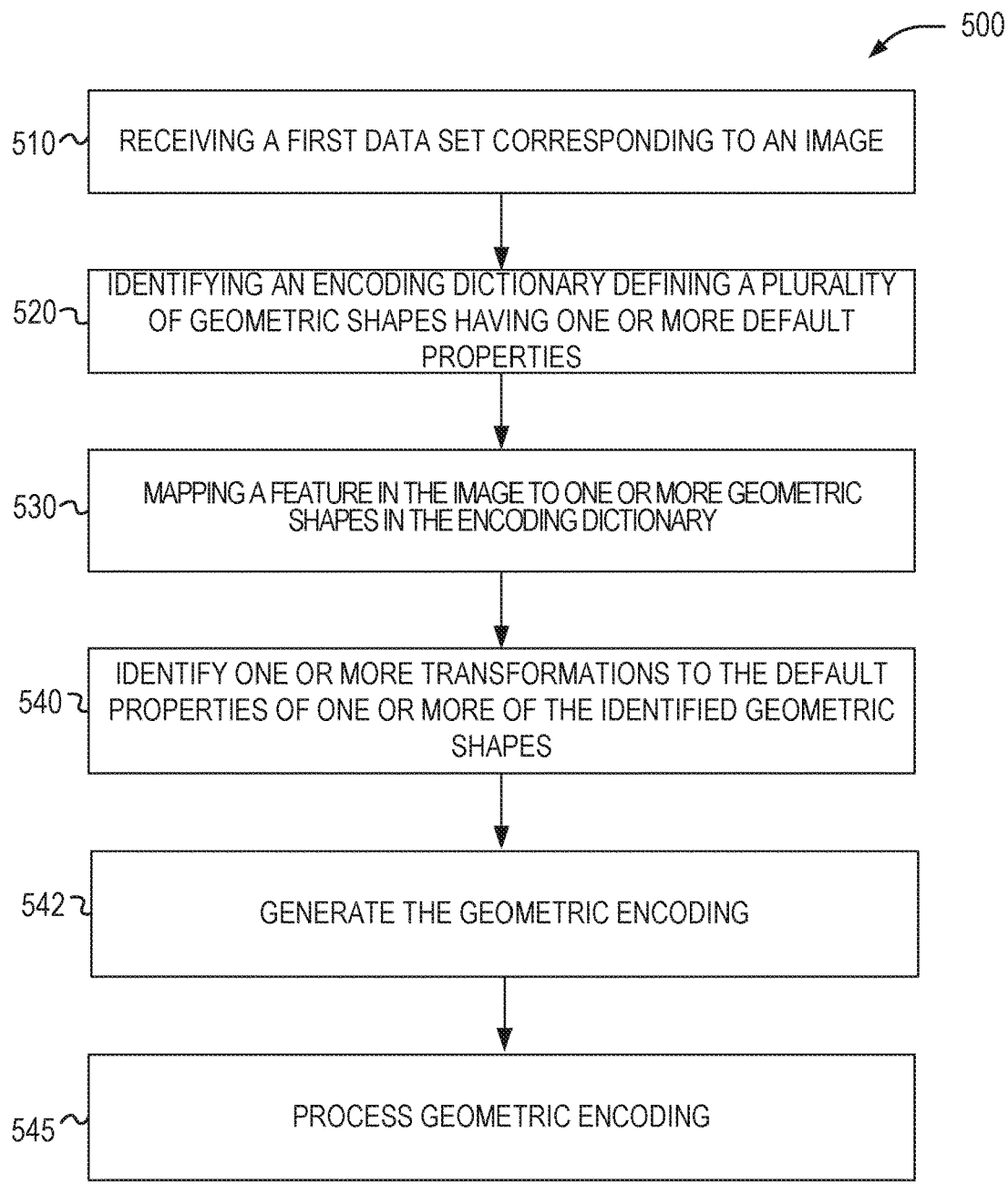
FIG. 5 illustrates a flowchart of a method of geometrically encoding data according to some examples of the present disclosure.

FIG. 5 illustrates a method 500 of geometrically encoding data according to some examples of the present disclosure. At operation 510 the geometric encoding system receives a first data set. For example, a binary data set that may be based upon some higher-level encoding, such as an image. The first data set may correspond to an image—such as being data representative of pixel values or frequency information (e.g., a bitmap or jpeg) or may be converted (e.g., such as described with reference to FIG. 2) into an image. At operation 520, an encoding dictionary is identified, the encoding dictionary defining a plurality of geometric shapes having one or more default properties. The default properties may comprise a property of a default construction of the shape. For example, a default radius, a default size, a default position of a default construction of the shape. The default properties define a reference by which transformations are applied. That is, a transformation is applied to the default construction of the shape. As previously disclosed, the geometric encoding dictionary may be selected based upon the data (and how well the encoding dictionary fits the data), may be a predetermined dictionary, may be determined based upon the higher level encoding of the input data (e.g., the file type—whether it is a .gif, .bmp, .jpg, or the like), or the like.

At operation 530, the geometric encoding system may mapping a feature in the image to a set of one or more geometric shapes in the encoding dictionary based upon image data of the image and attribute data of the set of one or more geometric shapes in the encoding dictionary, the attribute data comprising image data of the set of geometric shapes. For example, by comparing image data (e.g., pixel values or discrete Fourier transform data) of the image and image data of the geometric shapes in the encoding dictionary. The image data of the geometric shapes in the encoding dictionary may be a pixel value representation of one or more geometric shapes. The pixel values may be red, green, blue values, or values based upon the pixel values, such as cosine or sine coefficients or components. For example, by using computer vision algorithms to find features in the image, and then by comparing that to pixel intensity representations of shapes in the geometric encoding dictionary. The shape with the lowest error (e.g., the fewest number of mismatched pixels) may be selected. In some examples, various shape combinations may also be compared with the pixels of the feature.

At operation 540, one or more transformations to the default properties of the one or more of the identified geometric shapes may be found. For example, various combinations of transformations may be tried until an error is below a threshold. In some examples, the error may be the number of pixels that do not match between a first image that is the input image being encoded, and a second image that is a pixel representation of the shape with the transformation applied. In some examples, operation 540 is not performed and all that is in the encoding is the set of shapes. In other examples, operations 530 and 540 are performed concurrently using a variety of shapes—for example by trying a plurality of different shapes and a plurality of different transformations of those shapes and selecting the combination of the transformation and shape that produces a lowest error.

At operation 542, the system may generate a geometric encoding of the image, the geometric encoding comprising a set of symbols representing at least a portion of the image by specifying the set of one or more geometric shapes and the corresponding one or more transformations. That is, the feature and transformations identified in operations 530 and 540 are combined to form the geometric representation. For example, the encoding may be arranged as described with respect to FIG. 1.

At operation 545, the geometric encoding system may process the set of symbols. For example, by encrypting it, using it for image recognition, encoding it further, transmitting it, or the like.

In some examples, and as previously described the operations 530 and 540 may be done together or separately using one or more machine-learned models. These models may find the features, select the shape, and find the best transformations given a geometric encoding dictionary either using separate models, or a same model. For example, a model may have multiple layers, one of which selects a shape, another which applies various transformations, and the like.

Data may be encoded locally—e.g., on the computing device on which the input data to be encoded is stored, or the encoding may be provided as a network-based service. Various processing operations may make use of the improved encoding. A few example processing operations will now be described.

Data Security

In some examples, the geometrically encoded data may be more secure from one or more attackers. For example, if the set of geometric shapes in the encoding dictionary is kept secret, an adversary may be prevented from accessing the contents of the data. For example, the encoding dictionary may be mutually agreed upon by the parties to a communication session in which the encoded data is sent. Each party to the communication may know, in advance of the communication, the geometric encoding dictionary. In other examples, the encoding dictionary is selected by the sender and sent to the recipient but may be encrypted with one or more cryptographic keys such that only the intended recipient may decrypt the encoding dictionary. In some examples, the geometrically encoded data is not encrypted. Since the geometrically encoded data is not encrypted, this may save computing resources of the recipient by having to decrypt, at most, only the dictionary rather than the entire data set.

In other examples, both the dictionary and the encoded data may be encrypted using one or more cryptographic keys. The data may thus be double protected as an attacker would have to decrypt the binary data, then reverse engineer the encoding dictionary. This may protect the data from sophisticated attackers who may leverage quantum computing to break standard encryption schemes. In some other examples, the encoding dictionary may be encrypted by a first key and the encoded data may be encrypted by a second key. To unencrypt and decode the message, the recipient must have both keys to first unencrypt the encoded data and also a key to unencrypt the decoding dictionary. By using different keys to encrypt the decoding dictionary and the data, it doubles the work an adversary would need to decrypt the data.

In still other examples, data to be protected is first encrypted with a first key. The encrypted data is then geometrically encoded (e.g., as described with reference to FIG. 2). The geometric encoding dictionary may or may not be encrypted as previously described. The geometric encoding may then be encrypted again—resulting in three layers of protection if the geometric encoding dictionary is kept secret. As previously described the geometric dictionary, if transmitted, may be encrypted with a same key or a different key that was used to encrypt the data (either initially or encrypt the geometric encoding).

In order to ensure security, the encoding dictionary may be changed each time data is encoded. For example, one or more random permutations to the default characteristics of the shapes in the encoding dictionary (e.g., default position, default size, default transformations, etc. . . . ) may be made prior to encoding. Thus, the same file, with the same dictionary of basic geometric shapes may produce different encoded data with each encoding.

In some examples, the permutations may be based upon a seed value that is known to both sides of a communication attempt. That is, a seed value and a geometric encoding dictionary may be exchanged. Each subsequent message between the parties may be encrypted using a new geometric encoding dictionary that is changed based upon a random value produced using a pseudorandom generator seeded by the seed value. Thus, each side is able to calculate the next random number and permutate the geometric encoding dictionary. For example, the random number may change the identifiers of the shapes or transitions. For example, a circle may be identified with a 0 normally, but the random number generated for a particular message may be a 7. Each shape identifier may have the random number added to it. Thus, the circle would be identified with a 7 and the next shape with an 8, and so on. The same may be done with transformations. Other permutations based upon the seed may also be utilized. Unless the attacker knows that the geometric encoding dictionary is being changed each message, by permutating the geometric encoding dictionary, reverse engineering the geometric encoding dictionary may be very difficult.

In still other examples, a codebook may be utilized that specifies sequences of one or more geometric shapes and corresponding replacement sequences. For example, the codebook may specify a shape sequence of circle, circle, triangle and a replacement sequence of triangle, triangle, circle. The codebook then scrambles the encoded data such that the attacker needs both the encoding dictionary, the codebook, and in some examples cryptographic keys to decrypt the encoded data, the codebook, and/or the encoding dictionary.

In some examples, one of the above security methods may be employed. In other examples, more than one of the above security methods may be combined. In still other examples, all of the above security methods may be employed in combination. For example, the encoding dictionary may be kept secret and encrypted with a first key. The encoded data may be transformed using a codebook. The codebook may be encrypted with a second key. The encoded data that is transformed using a codebook may be encrypted with a third key. An attacker would have to intercept and possess the codebook, the encoding dictionary, and the encoded data as well as possess the corresponding decryption keys for all three. In other examples, data to be protected is first encrypted with a first key; then the data is geometrically encoded with a dictionary that changes every transmission using a seeded pseudorandom number generator; the geometric encoding is transformed using a codebook encrypted with a second key; the transformed geometric encoding is then encrypted again with a third key. Using brute force methods to attack this system would be very difficult.

Figure 6:
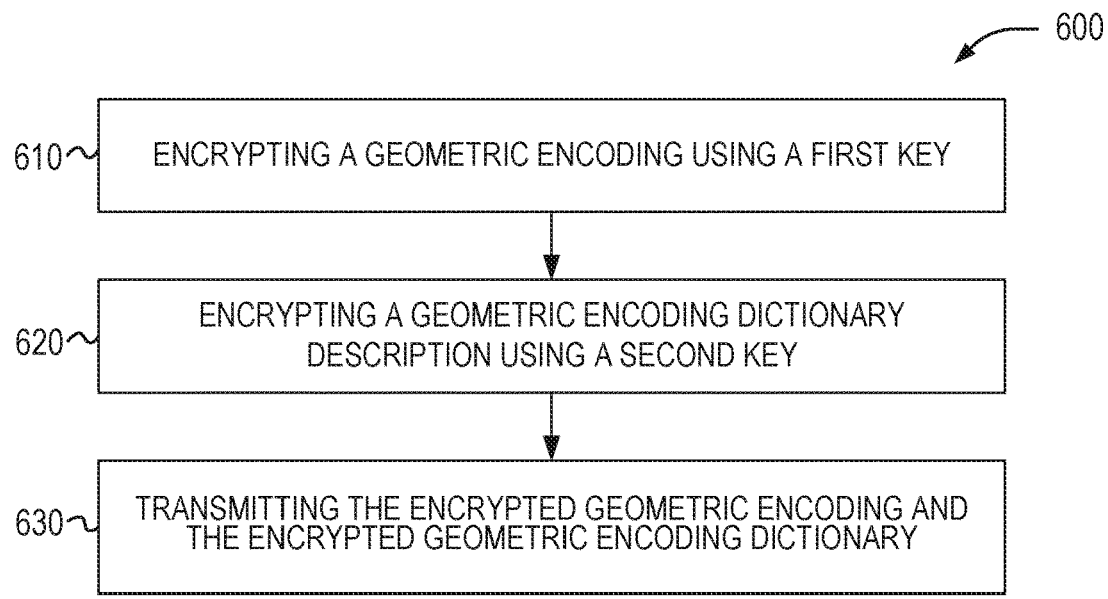
FIG. 6 illustrates a flowchart of a method of encrypting and transmitting a geometric encoding according to some examples of the present disclosure.

FIG. 6 illustrates a flowchart of a method 600 of encrypting and transmitting a geometric encoding according to some examples of the present disclosure. At operation 610 the geometric encoding may be encrypted using a first cryptographic key. At operation 620, a description of the encoding dictionary may be encrypted using a second key. The first key and second key may be a same key or a different key. In some examples, the encoding dictionary is not encrypted and thus operation 620 may be skipped. At operation 630, the geometric encoding and/or the encrypted (or non-encrypted) geometric encoding dictionary may be transmitted to the recipient.

Data Error Correction Encoding

In some examples, error correction coding may be more efficient when done when data is encoded according to the geometric encoding. For example, the geometrically encoded data may be additionally coded with error correction symbols according to a codebook. The codebook may specify sequences of two or more geometric shapes and sequences of two or more substitute (in some examples, three or more) geometric shapes. The substitute shapes may be the same shapes with extra shapes or may be different shapes altogether (with or without extra shapes). In some examples, if the substitute shapes are chosen properly, the loss of one or more shapes of the sequence may be recoverable by the receiver by comparing the remaining shapes. For example, if a portion of a code book is as follows:

Circle, circle, triangle, square is substituted for Circle, Circle

Circle, triangle, square, triangle is substituted for Square, Triangle

And the shapes as transmitted are Circle, Circle, Triangle, Square, Circle, Triangle, Square, Triangle; and the receiver receives Circle, unknown, triangle, square, circle, triangle, unknown, triangle—the receiver may utilize the codebook to fill in the unknowns as triangle, square because the received sequences are able to be matched to entries on the code book even with the missing shapes.

In some examples, the replacement shapes may be chosen to fit a transmission scheme that the data is to be transmitted using. For example, certain modulation schemes may wish to use power efficient symbols, or if the transmission medium is noisy, the modulation scheme may wish to avoid certain symbols. This may be accomplished by replacing two shapes that would be converted to symbols close together in the constellation map with three shapes that would be converted to symbols that are further apart but are corrected at the receiver to the original shapes.

The error correction codebook may be based upon the geometric shapes. For example, in the encoding dictionary from FIG. 1, a codebook may specify that for every third circle, include a duplicate circle. For example, if the encoded data was 0, 0, 0, the error correction encoded geometric encoded data may be 0, 0, 0, 0. In other examples, the codebook may specify that for every third circle, include additional encoding data for a shape not listed in the encoding dictionary. Thus, if the geometric encoded data was 0, 0, 0 (e.g., no transformations from the defaults), the geometric error correction encoded geometric data may be 0, 0, 0, 3. Where 3 symbolizes three consecutive circles. Similarly, combinations of different shapes may be used. For example, a successive circle, triangle, and square may be represented in the geometric error correction encoding as 0, 1, 2, 3.

While the above error correction encodes the shapes, it did not consider transformations. The transformations may be error correction encoded in a same manner, either with the geometric shapes, or separately with a separate codebook.

Figure 7:
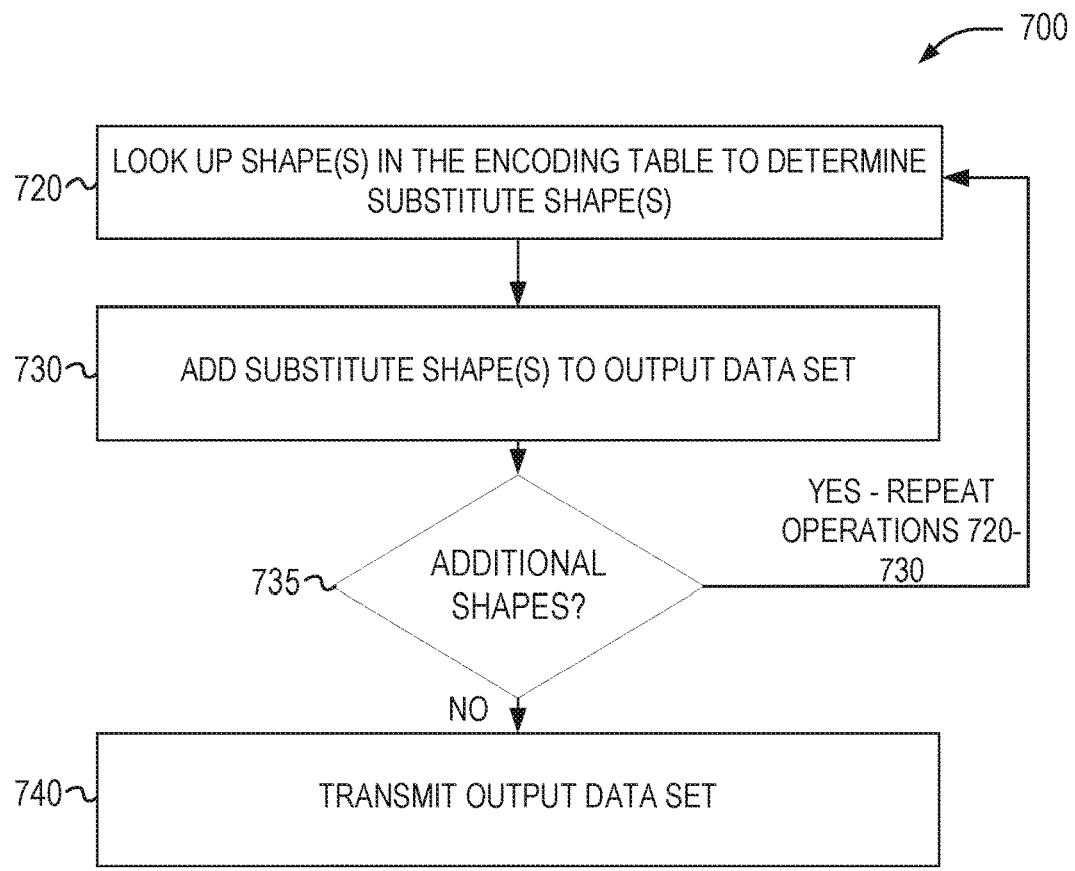
FIG. 7 illustrates a flowchart of a method of encoding a geometric encoding for transmission according to some examples of the present disclosure.

FIG. 7 illustrates a flowchart of a method 700 of encoding a geometric encoding for transmission according to some examples of the present disclosure. At operation 720, a first geometric encoding shape or shapes (e.g., one or more shape identifiers) is selected and a codebook is consulted to determine a corresponding substitute shape or shapes. At operation 730 the substitute shape or shapes are then added to the output data set. If at operation 735 it is determined that additional shapes are present in the geometric encoding, then operations 720-730 are repeated until the entire geometric representation is encoded. At operation 740, the output data set is transmitted. As previously noted, the transformations may be encoded along with the shape identifiers, or may be encoded separately, or may not be encoded.

Object Recognition

In some examples, geometric encoding may allow for more efficient object detection and recognition in an image or video frame. By utilizing geometric encodings, objects may be detected in input images using simple text-based searching of the geometric encoding of the input images. Object detection may include facial detection and/or recognition. Object detection may operate on a stream of video and/or images and may be done in real time or near real time (e.g., concurrently with video capture).

Sample images, called exemplars, of the object that is to be detected may be geometrically encoded. For example, pictures of a particular person in the case of facial recognition or pictures of faces in general for facial detection may be converted to respective geometric representations. The exemplars may contain only the object of interest, contain the object of interest and other objects and be labelled with the boundaries of the object of interest, or contain both the object of interest and other objects and the object of interest may be detected using feature recognition algorithms as previously explained. The object within the exemplars may be geometrically encoded and properties of the object may be determined. The properties may include the set of one or more shapes that make up the object; the ordering of the constituent shapes; the absolute and/or relative sizes of the constituent shapes; the relative positions of the constituent shapes; and the like.

The computing device may then look for the object described by the properties determined from the geometric encoding of the exemplars in a geometric encoding of the input image. For example, the computing device may search for the constituent shapes of the object in the proper order, and with the proper relative positions and sizes as described by the properties determined from the exemplars. This may be done using a simple text search of the geometric encoding of the input image. For example, if the object described by the properties determined from the geometric encoding of the exemplars is described by the shape sequence of circle, circle, square, then the computing device searches the input image for circle, circle, square in that order.

As noted, in addition to finding the constituent shapes, the computing device may consider the relative positions and size (and other transitions) between shapes. Thus, the relative sizes and positions between two or more shapes may be considered when looking at whether an object is in the geometric encoding of the input image. For example, an exemplar geometric representation may be processed to determine the relative transformations between the constituent shapes making up the object to be recognized. These relative transformations may be compared to relative transformations of a same grouping of shapes detected in the geometric representation of the input image to determine how similar the particular shapes in the geometric representation of the input image are to the exemplar. If the particular shapes in the geometric representation of the input image are similar in composition and the relative transformations of the shapes are within a similarity threshold, the system may determine that the object is within the input image.

For example, if the exemplar describes two circles that overlap slightly, such as (using the geometric encoding dictionary described above): (0, (2, 10, 10), (1, 10, 10)) and (0, (2, 10, 10), (1, 15, 10)). In this example, the circles overlap by 50% and are a same size. The system may then search the geometric encoding of the input image for two circles that overlap by 50% and are a same size. In some examples, minor variances may be allowed—for example, the object may be considered detected if the circles overlap by 45% and are sized within 5% of each other. These threshold tolerances may be set by a user, and/or learned by a machine learning algorithm that is trained using sample images and exemplars that are labelled with whether there is a match. For example, the machine learning modules in FIG. 4 may implement such a machine learning algorithm.

In some examples, the computing device may first search an input image for the constituent shapes (in any order) of the object as determined from the geometric encoding of the exemplar. If not all the constituent shapes from the exemplars are present in the input image, the computing device outputs an indication that the shape is not present in the image. This first pass may be done very quickly. If the input image contains the constituent shapes, the proper ordering may be checked. E.g., if the exemplar has a particular ordering of square, triangle, circle—the input image is checked to determine if this particular ordering exists. If not, then the computing device outputs an indication that the shape is not present in the image. This may also be done very quickly. If the proper ordering is present, the system may then consider the relative size, positions, and other properties of the geometric shapes. If the relative size, positions, and other attributes of the constituent shapes in the input image match the relative size, positions, and other attributes of the constituent shapes then the image may be considered matching.

In other examples, rather than text matching, a machine learning algorithm may be trained using various geometric representations (including the exemplars) labeled with whether the geometric representations depict the object. For example, the machine learning modules in FIG. 4 may be used to construct such a model.

If multiple exemplars are used, the system may look for multiple sets of properties in the input image—one set of properties for each exemplar. That is, a first exemplar may produce a first set of properties which is different than a second set of properties produced by a second exemplar. The system may search for each set of properties in the input image. In some examples, if one set of properties match, then the object is considered found. In other examples, a threshold number of sets of properties must be found to consider the object found.

In other examples, the system may use one or more pattern recognition machine learning methods to merge the multiple property sets into one set. Example pattern recognition machine learning methods may include Bayes classifiers, neural networks, perceptrons, support vector machines, and the like.

Figure 8:
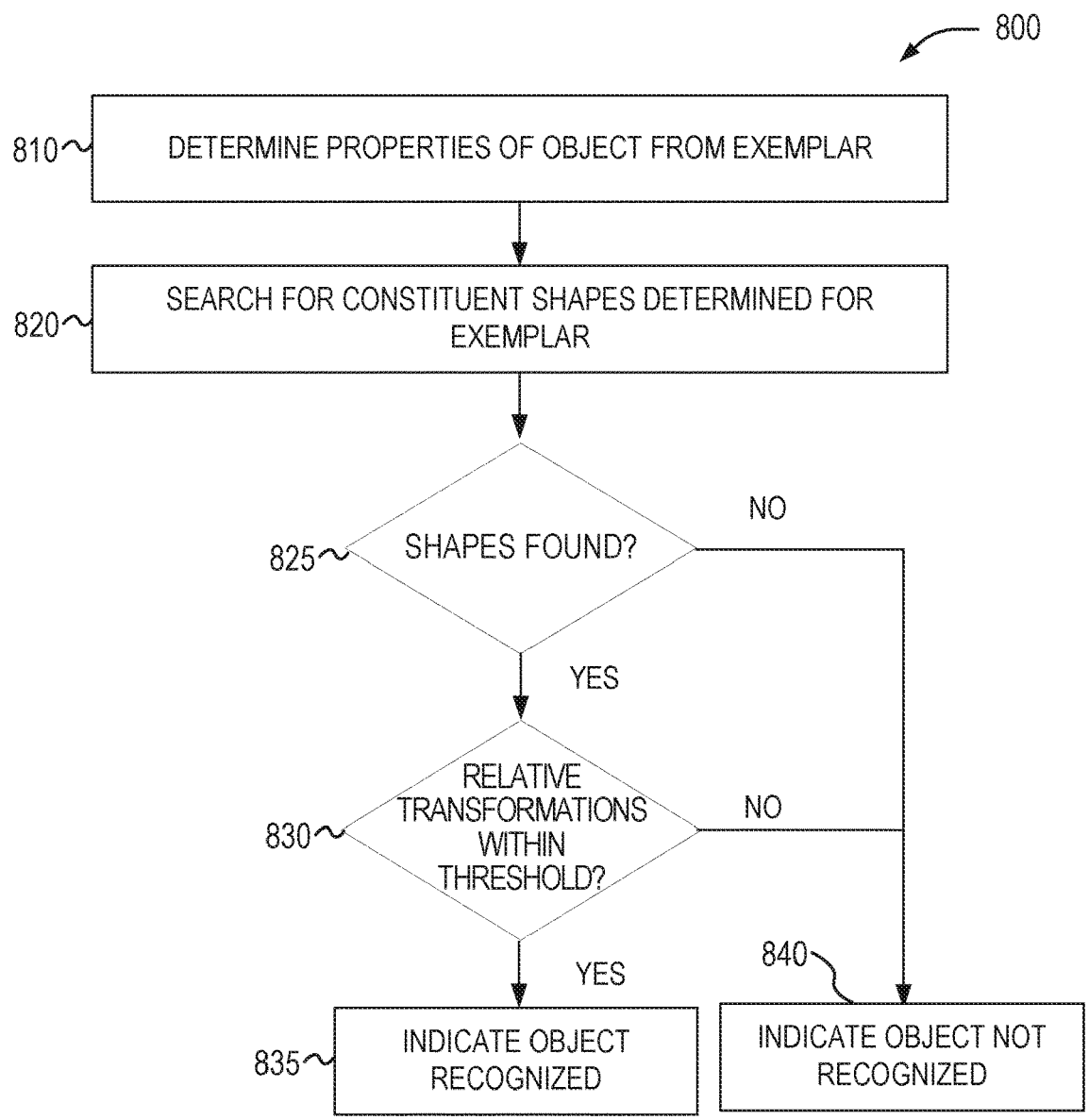
FIG. 8 illustrates a flowchart of a method of recognizing an object using a geometric representation according to some examples of the present disclosure.

FIG. 8 illustrates a flowchart of a method 800 of recognizing an object using a geometric representation according to some examples of the present disclosure. At operation 810, properties of the object may be determined from one or more exemplar images. For example, the constituent shapes of the object, their sequence, their relative positioning, their sizes (relative or absolute), and the like. At operation 820, the geometric representation of the input image may be searched for the constituent shapes of the object (as determined from the exemplars). In some examples, the search may be a text-based search looking for the identifiers of the shapes. If, at operation 825, it is determined that the shapes were not found, then at operation 840, the device may indicate that the object is not recognized. If at operation 825, it is determined that the shapes were found, then a determination may be made at operation 830 whether the relative transformations between those shapes is within a tolerance level (e.g., threshold). If so, then at operation 835, the device may indicate that the object is recognized. If not, then at operation 840, the device may indicate that the object is not recognized.

While the above described one particular example method of finding an object in an input image using exemplar images and geometric encodings, other methods may be utilized in conjunction with the geometric encoding. For example, the encoding dictionary may be customized for the one or more exemplars. For example, the n most common shapes in the exemplar may be selected as the encoding dictionary. The input image may then be geometrically encoded using the encoding dictionary customized based upon the exemplars. The geometric encoding of the input image may then be converted back to a pixel intensity representation (e.g., a bitmap) and compared with the input image. An error value may be calculated and compared with a threshold. If the error value is less than or equal to a threshold, then the object may be considered present in the input image. If the error value is greater than the threshold, then the object may be considered not present. This may be a relatively quick way of ascertaining of a likelihood of whether an object is present in an input image. This method takes advantage of the fact that images that are similar to the object (as represented by the exemplars) are likely to be encoded more accurately with a dictionary customized for the exemplars. In some examples, where the object is expected to be a smaller portion of the image, the input image may be broken up into portions and the process above applied to one or more of the portions.

Figure 9:
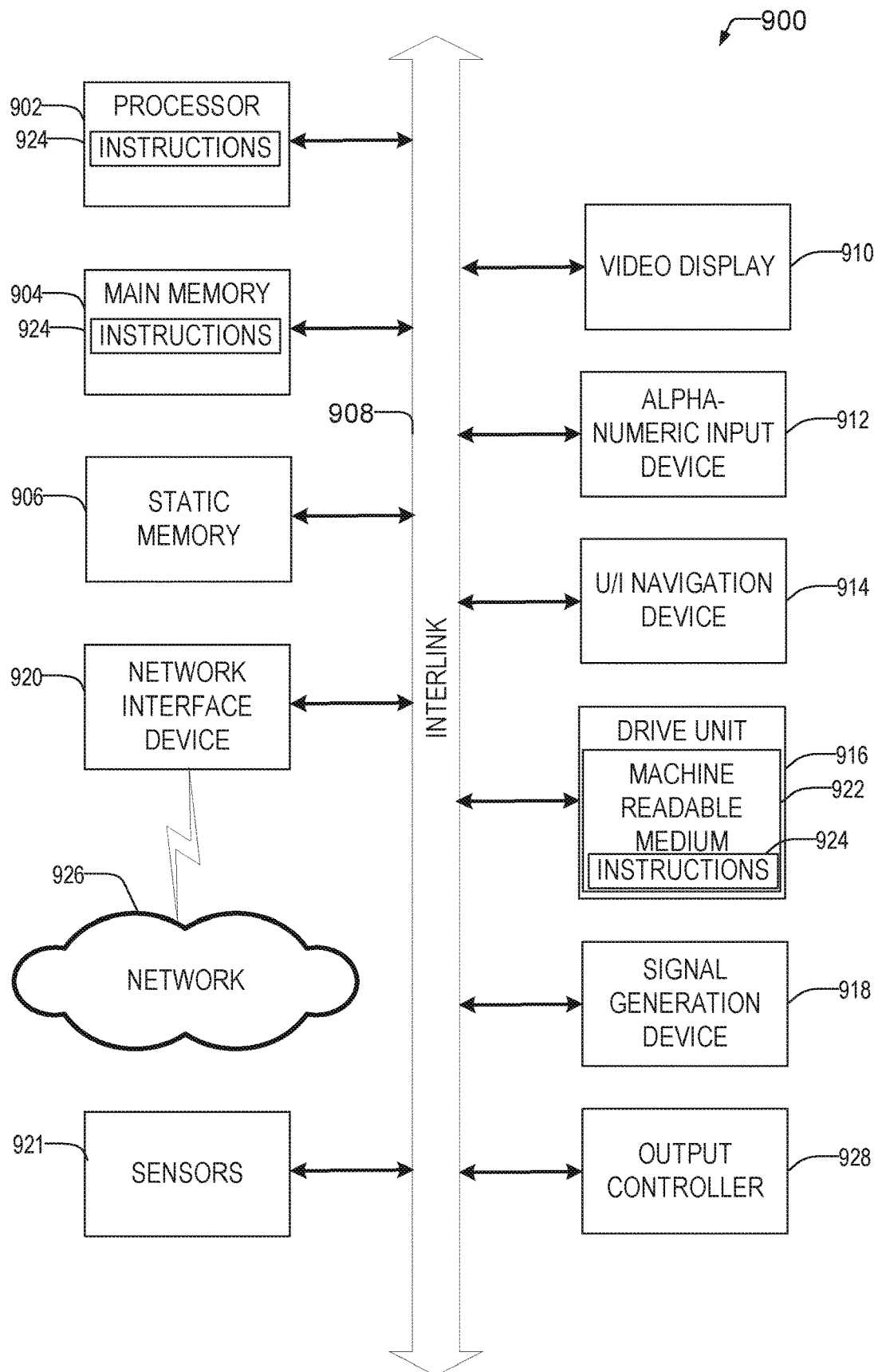
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 900 may implement any one or more of the methods of FIGS. 5-8 and include any one or more of the components of FIGS. 3 and 4.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UT) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The Machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Other Notes and Examples

Example 1 is a method for encoding data, the method comprising: using one or more processors: receiving a first data set corresponding to an image; identifying an encoding dictionary, the encoding dictionary defining a plurality of different geometric shapes, each shape of the plurality of geometric shapes having a default property, the default property a property of a default construction of the shape; mapping a feature in the image to a set of one or more geometric shapes in the encoding dictionary based upon image data of the image and attribute data of the set of one or more geometric shapes in the encoding dictionary, the attribute data comprising image data of the set of geometric shapes; identifying one or more transformations to the default property of one or more of the geometric shapes in the set of one or more geometric shapes which produces an error between the one or more of the geometric shapes and a portion of the corresponding feature that is below a threshold; generating a geometric encoding of the image, the geometric encoding comprising a set of symbols representing at least a portion of the image by specifying the set of one or more geometric shapes and the corresponding one or more transformations; and transmitting the geometric encoding of the image.

In Example 2, the subject matter of Example 1 includes, wherein mapping the feature and identifying one or more transformations comprises: applying the first data set as input to a machine-learned neural network, the machine-learned neural network trained using training sets of images and corresponding encodings.

In Example 3, the subject matter of Examples 1-2 includes, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

In Example 4, the subject matter of Examples 1-3 includes, wherein the image corresponding to the first data set is an image formed by a pattern of first and second binary values.

In Example 5, the subject matter of Examples 1-4 includes, wherein one of the one or more transformations comprises one or more of: a rotation, translation from a default position, enlargement, alpha value, or layer.

In Example 6, the subject matter of Examples 1-5 includes, wherein the encoding dictionary is a dictionary specific to a type of the first data set.

In Example 7, the subject matter of Examples 1-6 includes, wherein the geometric shapes comprise a line, a plane, a circle, an ellipsis, a triangle, a spline curve, a sphere, a cube, a toroid, a cylinder, a pyramid, or a triangle mesh.

In Example 8, the subject matter of Example 7 includes, wherein the geometric encoding comprises a custom shape created from at least two of the plurality of geometric shapes of the encoding dictionary.

In Example 9, the subject matter of Examples 1-8 includes, determining, from a geometrically encoded exemplar, a first set of shapes and relative positions of the first set of shapes to each; searching the set of symbols to determine whether the set of symbols includes a second set of shapes that includes the first set of shapes, the second set of shapes having relative positions to each other that are within a threshold distance to the relative positions of the first set of shapes in the exemplar; and responsive to determining that the set of symbols includes the second set of shapes that includes the first set of shapes, the second set of shapes having relative positions to each other that are within the threshold distance to the relative positions of the first set of shapes in the exemplar, setting an indicator to indicate that an object is detected in the set of symbols.

In Example 10, the subject matter of Examples 1-9 includes, applying an error correction coding to the set of symbols by matching combinations of two or more symbols with an error correction coding dictionary, the error correction coding dictionary substituting the two or more symbols with three or more replacement symbols; and replacing the two or more symbols in the set of symbols with the three or more replacement symbols.

Example 11 is a computing device for encoding data, the device comprising: a processor; a memory, storing instructions, which when executed by the processor, cause the processor to perform operations comprising: receiving a first data set corresponding to an image; identifying an encoding dictionary, the encoding dictionary defining a plurality of different geometric shapes, each shape of the plurality of geometric shapes having a default property, the default property a property of a default construction of the shape; mapping a feature in the image to a set of one or more geometric shapes in the encoding dictionary based upon image data of the image and attribute data of the set of one or more geometric shapes in the encoding dictionary, the attribute data comprising image data of the set of geometric shapes; identifying one or more transformations to the default property of one or more of the geometric shapes in the set of one or more geometric shapes which produces an error between the one or more of the geometric shapes and a portion of the corresponding feature that is below a threshold; generating a geometric encoding of the image, the geometric encoding comprising a set of symbols representing at least a portion of the image by specifying the set of one or more geometric shapes and the corresponding one or more transformations; and transmitting the geometric encoding of the image.

In Example 12, the subject matter of Example 11 includes, wherein the operations of mapping the feature and identifying one or more transformations comprises: applying the first data set as input to a machine-learned neural network, the machine-learned neural network trained using training sets of images and corresponding encodings.

In Example 13, the subject matter of Examples 11-12 includes, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

In Example 14, the subject matter of Examples 11-13 includes, wherein the image corresponding to the first data set is an image formed by a pattern of first and second binary values.

In Example 15, the subject matter of Examples 11-14 includes, wherein one of the one or more transformations comprises one or more of: a rotation, translation from a default position, enlargement, alpha value, or layer.

In Example 16, the subject matter of Examples 11-15 includes, wherein the encoding dictionary is a dictionary specific to a type of the first data set.

In Example 17, the subject matter of Examples 11-16 includes, wherein the geometric shapes comprise a line, a plane, a circle, an ellipsis, a triangle, a spline curve, a sphere, a cube, a toroid, a cylinder, a pyramid, or a triangle mesh.

In Example 18, the subject matter of Example 17 includes, wherein the geometric encoding comprises a custom shape created from at least two of the plurality of geometric shapes of the encoding dictionary.

In Example 19, the subject matter of Examples 11-18 includes, wherein the operations further comprise: determining, from a geometrically encoded exemplar, a first set of shapes and relative positions of the first set of shapes to each; searching the set of symbols to determine whether the set of symbols includes a second set of shapes that includes the first set of shapes, the second set of shapes having relative positions to each other that are within a threshold distance to the relative positions of the first set of shapes in the exemplar; and responsive to determining that the set of symbols includes the second set of shapes that includes the first set of shapes, the second set of shapes having relative positions to each other that are within the threshold distance to the relative positions of the first set of shapes in the exemplar, setting an indicator to indicate that an object is detected in the set of symbols.

In Example 20, the subject matter of Examples 11-19 includes, wherein the operations further comprise: applying an error correction coding to the set of symbols by matching combinations of two or more symbols with an error correction coding dictionary, the error correction coding dictionary substituting the two or more symbols with three or more replacement symbols; and replacing the two or more symbols in the set of symbols with the three or more replacement symbols.

Example 21 is a machine-readable medium, storing instructions, which when executed by a machine, cause the machine to perform operations comprising: receiving a first data set corresponding to an image; identifying an encoding dictionary, the encoding dictionary defining a plurality of different geometric shapes, each shape of the plurality of geometric shapes having a default property, the default property a property of a default construction of the shape; mapping a feature in the image to a set of one or more geometric shapes in the encoding dictionary based upon image data of the image and attribute data of the set of one or more geometric shapes in the encoding dictionary, the attribute data comprising image data of the set of geometric shapes; identifying one or more transformations to the default property of one or more of the geometric shapes in the set of one or more geometric shapes which produces an error between the one or more of the geometric shapes and a portion of the corresponding feature that is below a threshold; generating a geometric encoding of the image, the geometric encoding comprising a set of symbols representing at least a portion of the image by specifying the set of one or more geometric shapes and the corresponding one or more transformations; and transmitting the geometric encoding of the image.

In Example 22, the subject matter of Example 21 includes, wherein the operations of mapping the feature and identifying one or more transformations comprises: applying the first data set as input to a machine-learned neural network, the machine-learned neural network trained using training sets of images and corresponding encodings.

In Example 23, the subject matter of Examples 21-22 includes, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

In Example 24, the subject matter of Examples 21-23 includes, wherein the image corresponding to the first data set is an image formed by a pattern of first and second binary values.

In Example 25, the subject matter of Examples 21-24 includes, wherein one of the one or more transformations comprises one or more of: a rotation, translation from a default position, enlargement, alpha value, or layer.

In Example 26, the subject matter of Examples 21-25 includes, wherein the encoding dictionary is a dictionary specific to a type of the first data set.

In Example 27, the subject matter of Examples 21-26 includes, wherein the geometric shapes comprise a line, a plane, a circle, an ellipsis, a triangle, a spline curve, a sphere, a cube, a toroid, a cylinder, a pyramid, or a triangle mesh.

In Example 28, the subject matter of Example 27 includes, wherein the geometric encoding comprises a custom shape created from at least two of the plurality of geometric shapes of the encoding dictionary.

In Example 29, the subject matter of Examples 21-28 includes, wherein the operations further comprise: determining, from a geometrically encoded exemplar, a first set of shapes and relative positions of the first set of shapes to each; searching the set of symbols to determine whether the set of symbols includes a second set of shapes that includes the first set of shapes, the second set of shapes having relative positions to each other that are within a threshold distance to the relative positions of the first set of shapes in the exemplar; and responsive to determining that the set of symbols includes the second set of shapes that includes the first set of shapes, the second set of shapes having relative positions to each other that are within the threshold distance to the relative positions of the first set of shapes in the exemplar, setting an indicator to indicate that an object is detected in the set of symbols.

In Example 30, the subject matter of Examples 21-29 includes, wherein the operations further comprise: applying an error correction coding to the set of symbols by matching combinations of two or more symbols with an error correction coding dictionary, the error correction coding dictionary substituting the two or more symbols with three or more replacement symbols; and replacing the two or more symbols in the set of symbols with the three or more replacement symbols.

Example 31 is a device for encoding data, the device comprising: means for receiving a first data set corresponding to an image; means for identifying an encoding dictionary, the encoding dictionary defining a plurality of different geometric shapes, each shape of the plurality of geometric shapes having a default property, the default property a property of a default construction of the shape; means for mapping a feature in the image to a set of one or more geometric shapes in the encoding dictionary based upon image data of the image and attribute data of the set of one or more geometric shapes in the encoding dictionary, the attribute data comprising image data of the set of geometric shapes; means for identifying one or more transformations to the default property of one or more of the geometric shapes in the set of one or more geometric shapes which produces an error between the one or more of the geometric shapes and a portion of the corresponding feature that is below a threshold; means for generating a geometric encoding of the image, the geometric encoding comprising a set of symbols representing at least a portion of the image by specifying the set of one or more geometric shapes and the corresponding one or more transformations; and means for transmitting the geometric encoding of the image.

In Example 32, the subject matter of Example 31 includes, wherein the means for mapping the feature and identifying one or more transformations comprises: means for applying the first data set as input to a machine-learned neural network, the machine-learned neural network trained using training sets of images and corresponding encodings.

In Example 33, the subject matter of Examples 31-32 includes, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

In Example 34, the subject matter of Examples 31-33 includes, wherein the image corresponding to the first data set is an image formed by a pattern of first and second binary values.

In Example 35, the subject matter of Examples 31-34 includes, wherein one of the one or more transformations comprises one or more of: a rotation, translation from a default position, enlargement, alpha value, or layer.

In Example 36, the subject matter of Examples 31-35 includes, wherein the encoding dictionary is a dictionary specific to a type of the first data set.

In Example 37, the subject matter of Examples 31-36 includes, wherein the geometric shapes comprise a line, a plane, a circle, an ellipsis, a triangle, a spline curve, a sphere, a cube, a toroid, a cylinder, a pyramid, or a triangle mesh.

In Example 38, the subject matter of Example 37 includes, wherein the geometric encoding comprises a custom shape created from at least two of the plurality of geometric shapes of the encoding dictionary.

In Example 39, the subject matter of Examples 31-38 includes, means for determining, from a geometrically encoded exemplar, a first set of shapes and relative positions of the first set of shapes to each; means for searching the set of symbols to determine whether the set of symbols includes a second set of shapes that includes the first set of shapes, the second set of shapes having relative positions to each other that are within a threshold distance to the relative positions of the first set of shapes in the exemplar; and means for, responsive to determining that the set of symbols includes the second set of shapes that includes the first set of shapes, the second set of shapes having relative positions to each other that are within the threshold distance to the relative positions of the first set of shapes in the exemplar, setting an indicator to indicate that an object is detected in the set of symbols.

In Example 40, the subject matter of Examples 31-39 includes, means for applying an error correction coding to the set of symbols by matching combinations of two or more symbols with an error correction coding dictionary, the error correction coding dictionary substituting the two or more symbols with three or more replacement symbols; and means for replacing the two or more symbols in the set of symbols with the three or more replacement symbols.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

What is claimed is:

1. A computing device for encoding data, the device comprising:
   a processor;
   a memory, storing instructions, which when executed by the processor, cause the processor to perform operations comprising:
      receiving a first data set corresponding to an image;
      identifying an encoding dictionary, the encoding dictionary defining a plurality of different geometric shapes, each shape of the plurality of geometric shapes having a default property, the default property a property of a default construction of the shape;
      mapping a feature in the image to a set of one or more geometric shapes in the encoding dictionary based upon image data of the image and attribute data of the set of one or more geometric shapes in the encoding dictionary, the attribute data comprising image data of the set of geometric shapes;
      identifying one or more transformations to the default property of one or more of the geometric shapes in the set of one or more geometric shapes which produces an error between the one or more of the geometric shapes and a portion of the corresponding feature that is below a threshold;
      generating a geometric encoding of the image, the geometric encoding comprising a set of symbols representing at least a portion of the image by specifying the set of one or more geometric shapes and the corresponding one or more transformations;
      applying an error correction coding to the set of symbols to create an error corrected set of symbols by matching combinations of two or more symbols with an error correction coding dictionary, the error correction coding dictionary substituting the two or more symbols with three or more replacement symbols;
      replacing the two or more symbols in the set of symbols with the three or more replacement symbols; and
      transmitting the error corrected set of symbols.

2. The computing device of claim 1, wherein the operations of mapping the feature and identifying one or more transformations comprises:
   applying the first data set as input to a machine-learned neural network, the machine-learned neural network trained using training sets of images and corresponding encodings.

3. The computing device of claim 1, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

4. The computing device of claim 1, wherein the image corresponding to the first data set is an image formed by a pattern of first and second binary values.

5. The computing device of claim 1, wherein one of the one or more transformations comprises one or more of: a rotation, translation from a default position, enlargement, alpha value, or layer.

6. The computing device of claim 1, wherein the encoding dictionary is a dictionary specific to a type of the first data set.

7. The computing device of claim 1, wherein the geometric shapes comprise a line, a plane, a circle, an ellipsis, a triangle, a spline curve, a sphere, a cube, a toroid, a cylinder, a pyramid, or a triangle mesh.

8. The computing device of claim 7, wherein the geometric encoding comprises a custom shape created from at least two of the plurality of geometric shapes of the encoding dictionary.

9. The computing device of claim 1, wherein the operations further comprise:
   determining, from a geometrically encoded exemplar, a first set of shapes and relative positions of the first set of shapes to each;
   searching the set of symbols to determine whether the set of symbols includes a second set of shapes that includes the first set of shapes, the second set of shapes having relative positions to each other that are within a threshold distance to the relative positions of the first set of shapes in the exemplar; and responsive to determining that the set of symbols includes the second set of shapes that includes the first set of shapes, the second set of shapes having relative positions to each other that are within the threshold distance to the relative positions of the first set of shapes in the exemplar, setting an indicator to indicate that an object is detected in the set of symbols.

10. A method for encoding data, the method comprising: using one or more processors:
receiving a first data set corresponding to an image;
identifying an encoding dictionary, the encoding dictionary defining a plurality of different geometric shapes, each shape of the plurality of geometric shapes having a default property, the default property a property of a default construction of the shape;
mapping a feature in the image to a set of one or more geometric shapes in the encoding dictionary based upon image data of the image and attribute data of the set of one or more geometric shapes in the encoding dictionary, the attribute data comprising image data of the set of geometric shapes;
identifying one or more transformations to the default property of one or more of the geometric shapes in the set of one or more geometric shapes which produces an error between the one or more of the geometric shapes and a portion of the corresponding feature that is below a threshold;
generating a geometric encoding of the image, the geometric encoding comprising a set of symbols representing at least a portion of the image by specifying the set of one or more geometric shapes and the corresponding one or more transformations;
applying an error correction coding to the set of symbols to create an error corrected set of symbols by matching combinations of two or more symbols with an error correction coding dictionary, the error correction coding dictionary substituting the two or more symbols with three or more replacement symbols;
replacing the two or more symbols in the set of symbols with the three or more replacement symbols; and
transmitting the error corrected set of symbols.

11. The method of claim 10, wherein mapping the feature and identifying one or more transformations comprises:
applying the first data set as input to a machine-learned neural network, the machine-learned neural network trained using training sets of images and corresponding encodings.

12. The method of claim 10, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

13. The method of claim 10, wherein the image corresponding to the first data set is an image formed by a pattern of first and second binary values.

14. The method of claim 10, wherein one of the one or more transformations comprises one or more of: a rotation, translation from a default position, enlargement, alpha value, or layer.

15. A device for encoding data, the device comprising:
means for receiving a first data set corresponding to an image;
means for identifying an encoding dictionary, the encoding dictionary defining a plurality of different geometric shapes, each shape of the plurality of geometric shapes having a default property, the default property a property of a default construction of the shape;
means for mapping a feature in the image to a set of one or more geometric shapes in the encoding dictionary based upon image data of the image and attribute data of the set of one or more geometric shapes in the encoding dictionary, the attribute data comprising image data of the set of geometric shapes;
means for identifying one or more transformations to the default property of one or more of the geometric shapes in the set of one or more geometric shapes which produces an error between the one or more of the geometric shapes and a portion of the corresponding feature that is below a threshold;
means for generating a geometric encoding of the image, the geometric encoding comprising a set of symbols representing at least a portion of the image by specifying the set of one or more geometric shapes and the corresponding one or more transformations;
means for applying an error correction coding to the set of symbols to create an error corrected set of symbols by matching combinations of two or more symbols with an error correction coding dictionary, the error correction coding dictionary substituting the two or more symbols with three or more replacement symbols;
means for replacing the two or more symbols in the set of symbols with the three or more replacement symbols; and
means for transmitting the error corrected set of symbols.

16. The device of claim 15, wherein the means for mapping the feature and identifying one or more transformations comprises:
means for applying the first data set as input to a machine-learned neural network, the machine-learned neural network trained using training sets of images and corresponding encodings.

17. The device of claim 15, wherein the first data set represents an image as one of: a bitmap image format, a Joint Photographic Experts Group (JPEG) image format, a Graphics Interchange Format, a vector graphics format, or a Portable Network Graphics (PNG) format, and wherein the image corresponding to the first data set is an image described by the first data set.

18. The device of claim 15, wherein the image corresponding to the first data set is an image formed by a pattern of first and second binary values.

19. The device of claim 15, wherein one of the one or more transformations comprises one or more of: a rotation, translation from a default position, enlargement, alpha value, or layer.

* * * * *